(12) United States Patent
Takahashi

(10) Patent No.: US 8,307,409 B2
(45) Date of Patent: Nov. 6, 2012

(54) ELECTRONIC INFORMATION MANAGEMENT DEVICE, COMPUTER READABLE RECORDING MEDIUM, METHOD FOR CONTROLLING ACCESS, AND METHOD FOR TRANSFERRING DATA

(75) Inventor: Noriyasu Takahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 868 days.

(21) Appl. No.: 12/040,954

(22) Filed: Mar. 3, 2008

(65) Prior Publication Data
US 2009/0064285 A1   Mar. 5, 2009

(30) Foreign Application Priority Data

Aug. 31, 2007  (JP) ................................ 2007-227056

(51) Int. Cl.
*G06F 17/30* (2006.01)
(52) U.S. Cl. ............... 726/4; 726/21; 713/165; 713/167
(58) Field of Classification Search .............. 726/4, 21; 713/165, 167
See application file for complete search history.

(56) References Cited

U.S. PATENT DOCUMENTS

| | | | |
|---|---|---|---|
| 5,568,640 A | | 10/1996 | Nishiyama et al. |
| 5,802,541 A | * | 9/1998 | Reed ................................. 711/1 |
| 5,896,555 A | * | 4/1999 | Yoshinobu ..................... 725/117 |
| 7,024,689 B2 | * | 4/2006 | O'Donnell et al. ................ 726/4 |
| 7,421,555 B2 | * | 9/2008 | Dorey ............................ 711/164 |
| 7,702,693 B1 | * | 4/2010 | Aiyagari et al. .............. 707/785 |
| 7,801,918 B2 | * | 9/2010 | Iwase ............................ 707/785 |
| 2003/0120655 A1 | | 6/2003 | Ohwada et al. |
| 2005/0262572 A1 | * | 11/2005 | Yoneyama ....................... 726/27 |
| 2006/0059211 A1 | * | 3/2006 | Futatsugi ....................... 707/204 |
| 2006/0130150 A1 | * | 6/2006 | Garza-Gonzalez et al. ..... 726/28 |
| 2007/0088725 A1 | * | 4/2007 | Demiroski et al. ........... 707/100 |
| 2007/0157288 A1 | * | 7/2007 | Lim .................................. 726/1 |

(Continued)

FOREIGN PATENT DOCUMENTS

JP   4-373040 A   12/1992

(Continued)

OTHER PUBLICATIONS

Hiroyuki Nemoto, Prohibited strategy of Windows net, Nikkei NETWORK, Japan, Nikkei BP, May 22, 2005, vol. 62, p. 92-93.*

(Continued)

*Primary Examiner* — April Shan
*Assistant Examiner* — Shu Chun Gao
(74) *Attorney, Agent, or Firm* — Sughrue Mion, PLLC

(57) ABSTRACT

An electronic information management device includes: an associating unit that associates electronic information with first access right information with respect to each user, the electronic information being associated with an associated site so that the electronic information is stored at the associated site, the associating unit further associating the associated site with second access right information with respect to each user; a receiving unit that receives a request for access to the electronic information from a user; a determining unit that, when the receiving unit receives a request for access to the electronic information, determines the sum of the first access right information and the second access right information, and, based on the sum of the access right information, determines whether to allow the user to access the electronic information; and an access controlling unit that controls access to the electronic information in accordance with the determination result of the determining unit.

8 Claims, 14 Drawing Sheets

U.S. PATENT DOCUMENTS

| | | | |
|---|---|---|---|
| 2008/0092068 A1* | 4/2008 | Norring et al. | 715/762 |
| 2009/0228835 A1* | 9/2009 | Takahashi | 715/826 |
| 2010/0191933 A1* | 7/2010 | Sonnekalb | 712/30 |
| 2010/0242083 A1* | 9/2010 | Begum et al. | 726/1 |

FOREIGN PATENT DOCUMENTS

| | | |
|---|---|---|
| JP | 05-128157 A | 5/1993 |
| JP | 07-084858 A | 3/1995 |
| JP | 8-161215 A | 6/1996 |
| JP | 2000155715 A | 6/2000 |
| JP | 2002-288016 A | 4/2002 |
| JP | 2003091448 A | 3/2003 |
| JP | 2003-131919 A | 5/2003 |
| JP | 2003-131920 A | 5/2003 |
| JP | 2003223363 A | 8/2003 |
| JP | 2004-133505 A | 4/2004 |
| JP | 2005-215743 A | 8/2005 |
| JP | 2006-079465 A | 3/2006 |
| JP | 2006079465 A | 3/2006 |
| JP | 2006-106986 A | 4/2006 |
| JP | 2006-163872 A | 6/2006 |

OTHER PUBLICATIONS

Japanese Office Action dated Feb. 9, 2010 for Japanese Patent Application No. 2007-227056 and English-language translation.

Japanese Office Action dated Jul. 6, 2010 for corresponding Japanese patent application No. 2010-085623.

Hiroyuki Nemoto; "Prohibited Strategy of Windows net", Nikkei NETWORK, May 22, 2005, pp. 92-93, vol. 62, Nikkei BP, Japan.

* cited by examiner

FIG. 10

| ACCESS CONTROL LIST OF FOLDER A | | | | |
|---|---|---|---|---|
| USER | Read | Write | Delete | ... |
| AAA | O | O | O | ... |
| BBB | O | O | O | ... |
| CCC | O | O | O | ... |

| ACCESS CONTROL LIST OF FOLDER B | | | | |
|---|---|---|---|---|
| USER | Read | Write | Delete | ... |
| AAA | O | O | O | ... |
| XXX | O | O | O | ... |
| YYY | O | | | ... |

| ACCESS CONTROL LIST OF FOLDER C | | | | |
|---|---|---|---|---|
| USER | Read | Write | Delete | ... |
| DDD | O | | | ... |
| EEE | O | | | ... |
| FFF | O | | | ... |

| SUM OF ACCESS CONTROL LISTS OF ALL FOLDERS | | | | |
|---|---|---|---|---|
| USER | Read | Write | Delete | ... |
| AAA | O | O | O | ... |
| BBB | O | O | O | ... |
| CCC | O | O | O | ... |
| DDD | O | | | ... |
| EEE | O | | | ... |
| FFF | O | | | ... |
| XXX | O | O | O | ... |
| YYY | O | | | ... |

FIG. 11

| ACCESS CONTROL LIST OF FOLDER A | | | | |
|---|---|---|---|---|
| USER | Read | Write | Delete | ... |
| AAA | O | O | O | ... |
| BBB | O | O | O | ... |
| CCC | O | O | O | ... |

| ACCESS CONTROL LIST OF FOLDER B | | | | |
|---|---|---|---|---|
| USER | Read | Write | Delete | ... |
| AAA | O | O | O | ... |
| XXX | O | O | O | ... |
| YYY | O | | | ... |

| ACCESS CONTROL LIST OF FOLDER C | | | | |
|---|---|---|---|---|
| USER | Read | Write | Delete | ... |
| DDD | O | | | ... |
| EEE | O | | | ... |
| FFF | O | | | ... |

| ACCESS CONTROL LIST OF FILE L | | | | |
|---|---|---|---|---|
| USER | Read | Write | Delete | ... |
| AAA | O | O | | ... |
| BBB | O | O | | ... |
| CCC | O | O | | ... |

| SUM OF ACCESS CONTROL LIST OF FILE AND ACCESS CONTROL LISTS OF ALL FOLDERS | | | | |
|---|---|---|---|---|
| USER | Read | Write | Delete | ... |
| AAA | O | O | O | ... |
| BBB | O | O | O | ... |
| CCC | O | O | O | ... |
| DDD | O | | | ... |
| EEE | O | | | ... |
| FFF | O | | | ... |
| XXX | O | O | O | ... |
| YYY | O | | | ... |

# ELECTRONIC INFORMATION MANAGEMENT DEVICE, COMPUTER READABLE RECORDING MEDIUM, METHOD FOR CONTROLLING ACCESS, AND METHOD FOR TRANSFERRING DATA

CROSS-REFERENCE TO RELATED APPLICATION

This application is based on and claims priority under 35 USC 119 from Japanese Patent Application No. 2007-227056 filed Aug. 31, 2007.

BACKGROUND

1. Technical Field

The present invention relates to an electronic information management device, a computer readable recording medium, a method for controlling access, and a method for transferring data.

2. Related Art

There has been a file management method for determining whether to allow access to file data, based on user attribute information, file attribute information, and link attribute information.

There has also been a file management system that manages files to be shared among users, and is characterized by having link information for associating files with one another and for managing each of the files.

SUMMARY

According to an aspect of the invention, there is provided an electronic information management device that includes: an associating unit that associates electronic information with first access right information with respect to each user, the electronic information being associated with an associated site so that the electronic information is stored at the associated site, the associating unit further associating the associated site with second access right information with respect to each user; a receiving unit that receives a request for access to the electronic information from a user; a determining unit that, when the receiving unit receives a request for access to the electronic information, determines the sum of the first access right information associated with the electronic information to be accessed and the second access right information associated with the associated site at which the electronic information to be accessed is stored, and, based on the sum of the access right information, determines whether to allow the user to access the electronic information; and an access controlling unit that controls access to the electronic information in accordance with the determination result of the determining unit.

BRIEF DESCRIPTION OF THE DRAWINGS

Exemplary embodiments of the present invention will be described in detail based on the following figures, wherein:

FIG. 10 shows an example of the sum of the access control lists of folder A, folder B, and folder C;

FIG. 11 shows an example of the sum of the access control lists of file L, folder A, folder B, and folder C;

DETAILED DESCRIPTION

The following is a description of exemplary embodiments of the present invention, with reference to the accompanying drawings.

First Exemplary Embodiment

Figure 1:
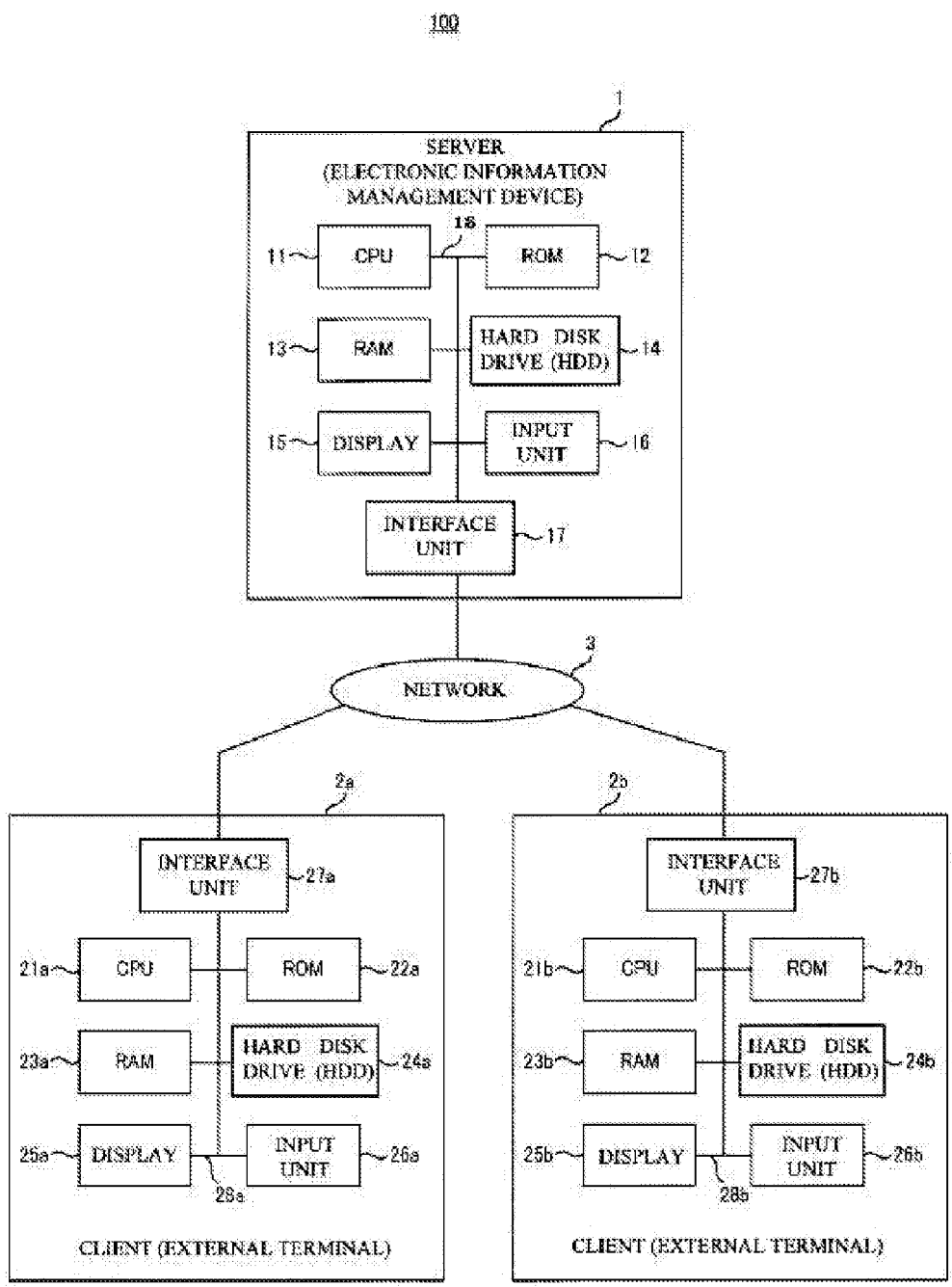
FIG. 1 is a block diagram showing an example structure of an electronic information management system that includes an electronic information management device and external terminals in accordance with a first exemplary embodiment of the present invention.

FIG. 1 is a block diagram showing an example structure of an electronic information management system that includes an electronic information management device and external terminals in accordance with a first exemplary embodiment of the present invention.

The electronic information management system 100 includes a server 1 as an electronic information management device, and clients 2a and 2b as external terminals. The server 1 is connected to the clients 2a and 2b via a network 3. Alternatively, the connection of the server 1 to the clients 2a and 2b may be established via a communication means other than a network, such as a special-purpose line. The number of clients to be connected to the server 1 may be one or more.

The server 1 is formed with a computer, and includes a CPU 11 that controls the entire device, a ROM 12 having a control program, a RAM 13 that functions as a working area, a hard disk drive (HDD) 14 that stores various kinds of information and programs, a display 15 that is formed with a liquid crystal monitor, a CRT, or the like, an input unit 16 that is formed with a mouse and keyboard, for example, and an interface unit 17 for establishing connections with the clients 2a and 2b. The CPU 11 is connected to the ROM 12, the RAM 13, the HDD 14, the display 15, the input unit 16, and the interface unit 17, via a system bus 18.

The HDD 14 stores files of various data, such as text data, image data, and audio data, a user authentication information list, file access control lists (described later), and folder access control lists (described later). A unique ID is attached to each file. Here, a file is an example of electronic information, and a folder is an example of a storage site of electronic information. Alternatively, a unique ID is attached to two or more related pieces of electronic information about an electronic information main unit, the corresponding thumbnail image, and the corresponding print image.

The clients 2a and 2b are formed with computers. The clients 2a and 2b include CPUs 21a and 21b that control the entire devices, ROMs 22a and 22b each having a control program, RAMs 23a and 23b that function as working areas, hard disk drives (HDDs) 24a and 24b that store various kinds of information and programs, displays 25a and 25b that are formed with liquid crystal monitors or CRTs, for example, input units 26a and 26b each formed with a mouse and a keyboard, for example, and interface units 27a and 27b for establishing connections with the server 1. The CPUs 21a and 21b are connected to the ROMs 22a and 22b, the RAMs 23a and 23b, the HDDs 24a and 24b, the displays 25a and 25b, the input units 26a and 26b, and the interface units 27a and 27b, via system buses 28a and 28b, respectively.

When a user wishes to access some data (a file or a folder) stored in the HDD 14, the user should input a user ID and a password with the use of the input unit 26a or 26b. The user ID and the password are transmitted from the client 2a or 2b to the CPU 11 of the server 1. The CPU 11 then refers to the user authentication information list about the user ID and the password, and identifies the user who has made the access.

In the following description, the client 2a is used as a typical example of a client, but the client 2b may replace the client 2a.

Figure 2:
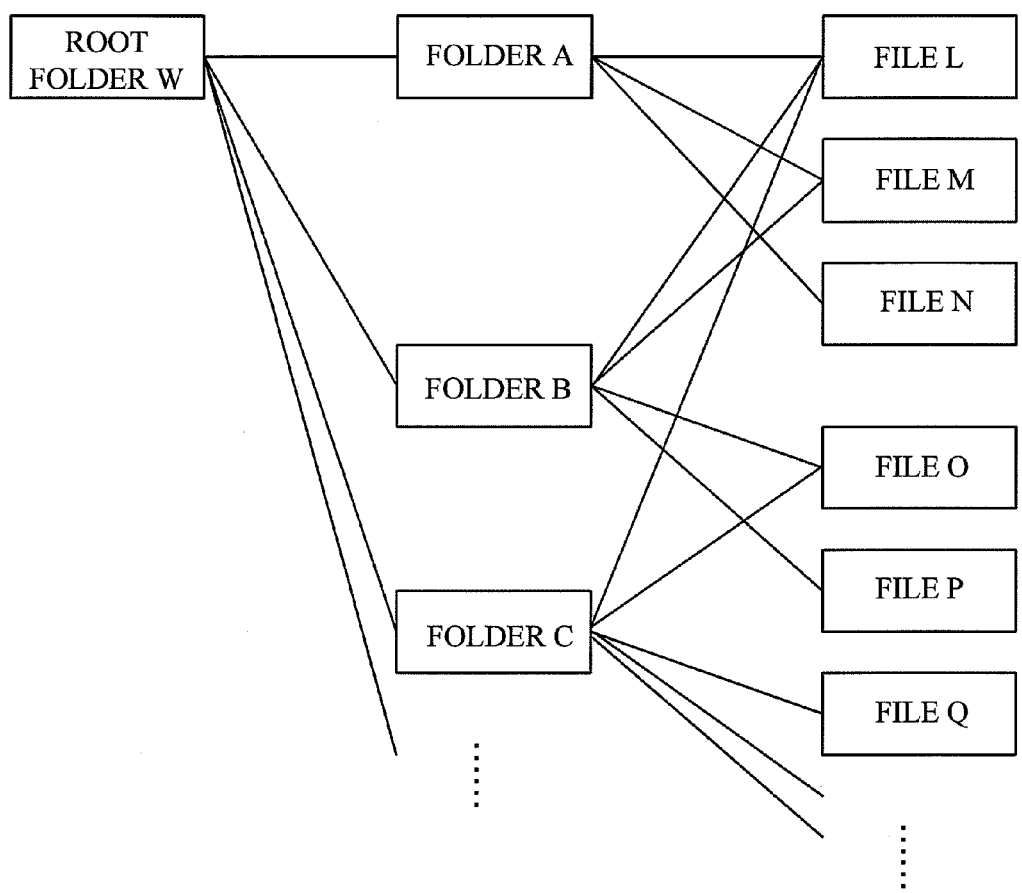
FIG. 2 shows an example of the file system of the hard disk drive (HDD)

FIG. 2 shows an example of the file system of the HDD 14.

A root folder w is stored as the higher layer in the HDD 14. Lower layers of the root folder include various folders such as a folder A, a folder B, and a folder C. The folder A contains a file L, a file M, a file N, and the likes. The folder B contains a file O, a file P, and the likes. The folder C contains a file Q and the likes. The file L is associated with the folder A, the folder B, and the folder C. The file M is associated with the folder A and the folder B. The file N is associated with the folder A. The file O is associated with the folder B and the folder C. The file P is associated with the folder B. The file Q is associated with the folder C. In this manner, each of the files is associated with one or more folders. Each file associated with two or more folders can be accessed from any of the two or more folders.

Figure 3:
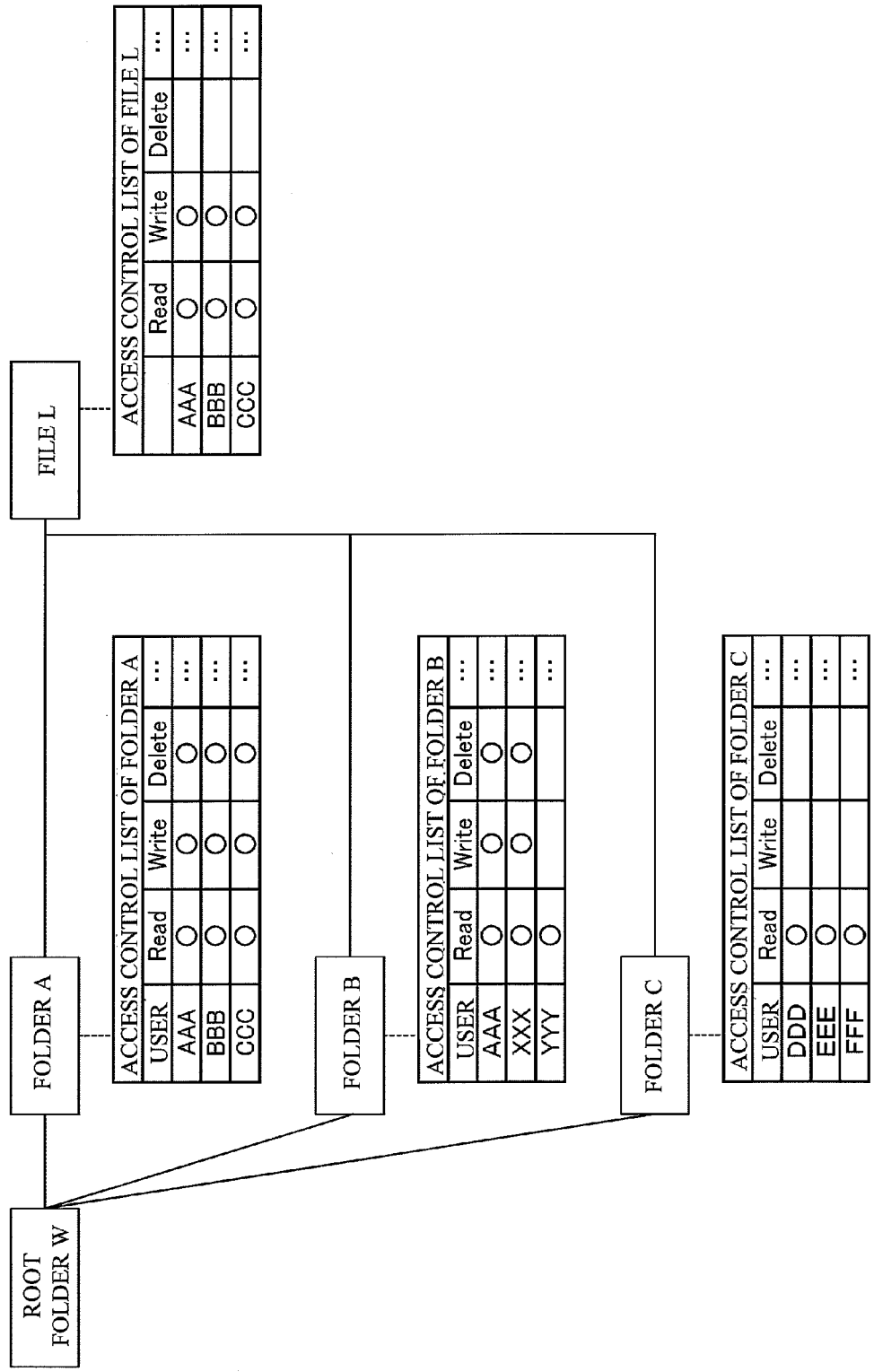
FIG. 3 shows an example of the relationship among folders and a file and access control lists stored in the HDD.

FIG. 3 shows an example of the relationship among the folders, the files, and the access control lists stored in the HDD 14.

The access control lists are used by the CPU 11 to determine whether a user has the access right, when the user requests access to a file or a folder. Here, "access" is an operation such as writing the data of a file or a folder on a recording medium such as a RAM, a ROM, or a HDD, reading the data of a file or a folder from a recording medium, or deleting the data of a file or a folder. The access right is the right to access the data of a file or a folder.

As shown in FIG. 3, each folder associated with each corresponding access control list is stored in the HDD 14. The method of registering the access control lists in the HDD 14 will be described later.

In the access control list of the folder A, each of the users having user IDs AAA, BBB, and CCC, respectively, is given the read right (Read), the write right (Write), and the delete right (Delete). The read right (Read) for the folder A is the right to read the folder A. More specifically, the read right for the folder A is the right to read information about the files and folders (such as the file names and folder names) stored in the folder A. The write right (Write) for the folder A is the right to store files and folders in the folder A. The delete right (Delete) for the folder A is the right to delete the folder A.

In the access control list of the folder B, each of the users AAA and XXX is given the read right (Read), the write right (Write), and the delete right (Delete). The user YYY is given the read right (Read).

In the access control list of the folder C, each of the users DDD, EEE, and FFF is given the read right (Read).

In the access control list of the file L, each of the users having user IDs AAA, BBB, and CCC, respectively, is given the read right (Read) and the write right (Write) The read right (Read) for the file L is the right to read the file L. The write right (Write) for the file L is the right to perform writing in the file L. The delete right (Delete) for the file L is the right to delete the file L.

The types of access rights are not limited to the read right (Read), the write right (Write), and the delete right (Delete), but may include the alter right or the copy right.

Figure 4:
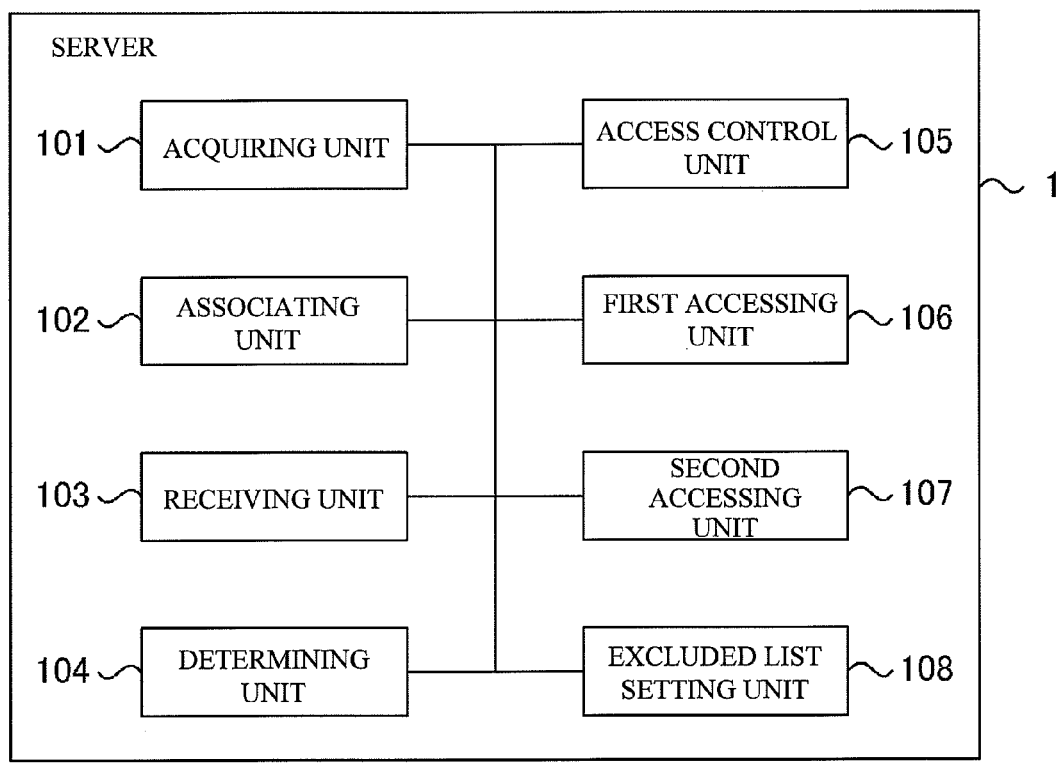
FIG. 4 is a functional block diagram of the server shown in FIG. 1.

FIG. 4 shows an example functional block diagram of the server 1 of FIG. 1.

The server 1 includes: an acquiring unit 101 that acquires a user ID and a password from the client 2a or 2b; an associating unit 102 that associates each file associated with a folder with an access control list that defines the access right of each user to the file, and associates each folder with an access control list that defines the access right of each user to the folder; a receiving unit 103 that receives a request from a user for access to a file; a determining unit 104 that determines whether the receiving unit has received an access request, determines whether each of the flags (described later) indicates "true", determines whether there is an access control list of a folder to be excluded, and determines whether to allow each user to access the folder; an access control unit 105 that controls access to files, in accordance with the results of determinations on access allowance/disallowance; a first accessing unit 106 that receives a request to access a file, and accesses the file in accordance with the received access request; a second accessing unit 107 that receives a choice of a folder and a file stored in the folder, and accesses the file in accordance with the received choice of the folder and the file; and an excluded list setting unit 108 that designates an access control list to be excluded from the access control lists that define the access rights to the folders and are used by the determining unit 104.

The associating unit 102, the determining unit 104, the access control unit 105, and the excluded list setting unit 108 are equivalent to the functions to be realized by the CPU 11 in accordance with the control program stored in the ROM 12 or the HDD 14. The acquiring unit 101 and the receiving unit 103 are equivalent to the functions to be realized by the interface unit 17. The first accessing unit 106 and the second accessing unit 107 are equivalent to the functions to be realized by the CPU 11 and the interface unit 17. Accordingly, it is also possible to cause a computer (including a CPU) to function as the above-described components in accordance with the control program stored in the ROM 12 or the HDD 14.

Figure 5A:
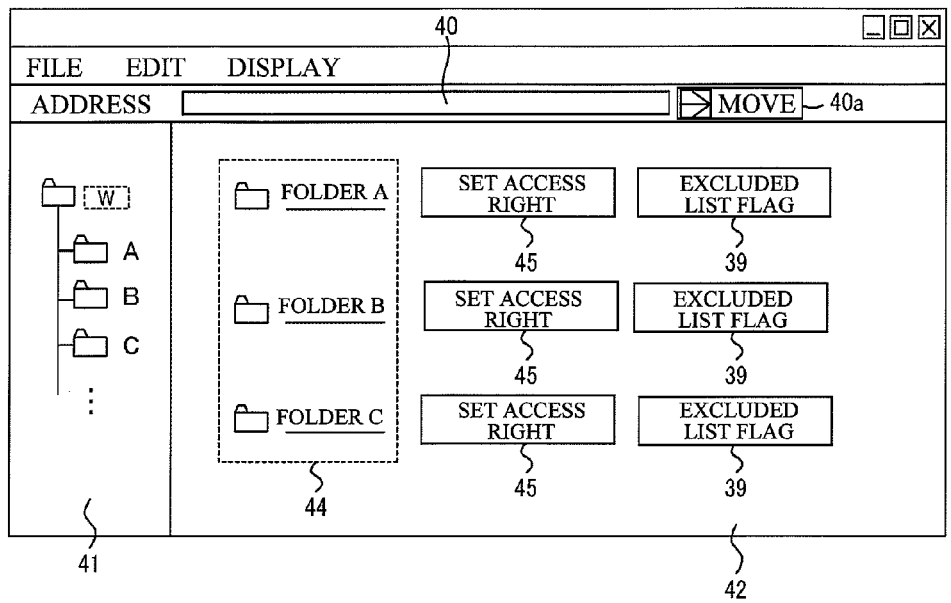
FIGS. 5A and 5B show examples of user interfaces (UIs) to be displayed on the display of a client.
Figure 5B:
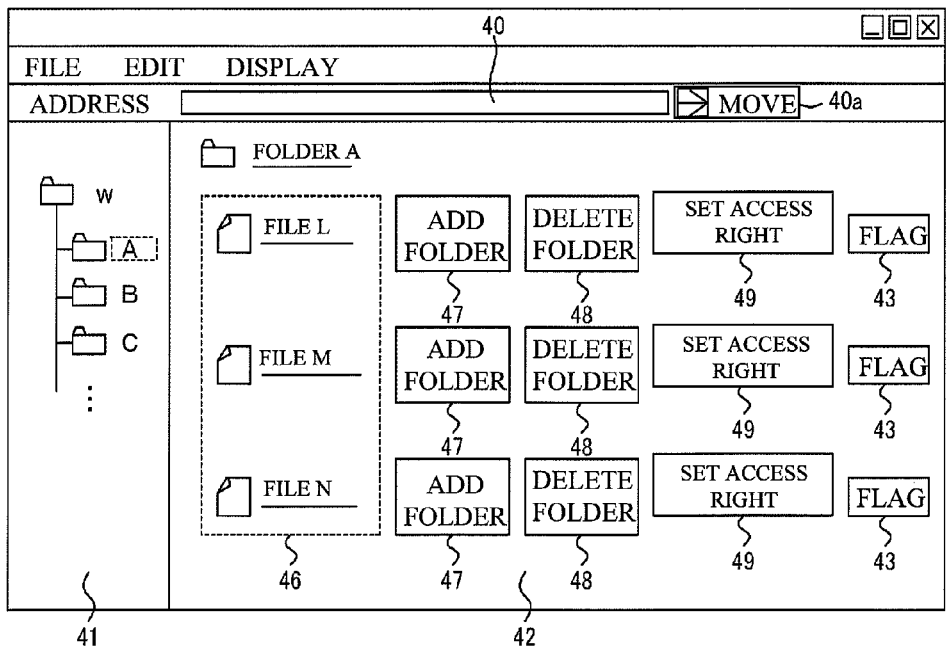

FIGS. 5A and 5B show examples of user interfaces (hereinafter referred to as the UI) to be displayed on the display 25a of the client 2a.

More specifically, FIG. 5A shows an example of a UI to be displayed on the display 25a when the root folder w is selected. FIG. 5B shows an example of a UI to be displayed on the display 25a when the folder A is selected.

The UI shown in FIG. 5A includes an address input box 40, a tree structure displaying space 41, and a contents displaying space 42. The address of a file is input to the address input box 40 with the use of the input unit 26a. When a move button 40a is clicked, the application for displaying the file contents is started, so that the operator can view the contents of the file.

The tree structure displaying space 41 shows the tree structure of folders. When a folder in the tree structure displaying space 41 is selected with the use of the input unit 26*a*, the data (folders or files) contained in the selected folder is displayed in the contents displaying space 42.

The contents displaying space 42 displays icons 44 for the folder A, the folder B, and the folder C, access right setting buttons 45 corresponding to the respective icons 44, and excluded list flag buttons 39 corresponding to the respective icons 44.

Figure 6A:
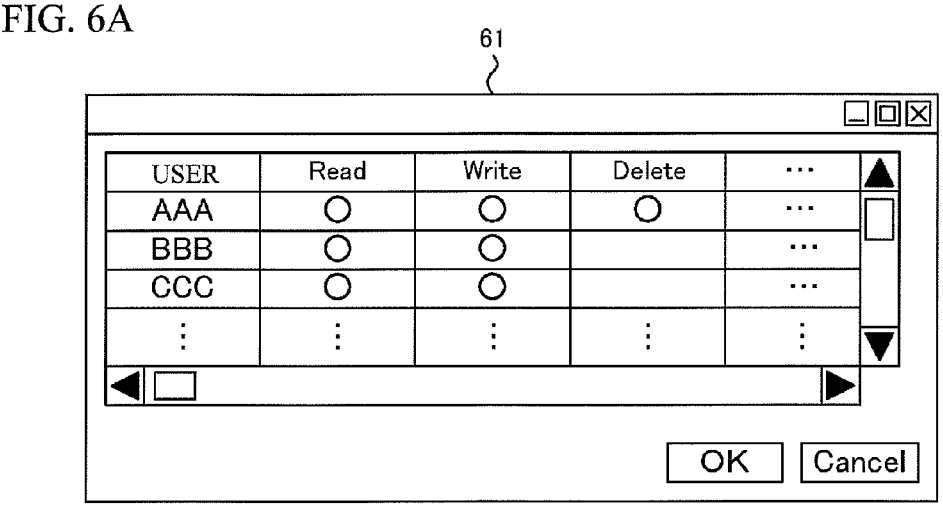
FIG. 6A shows an example of the sub window for setting access rights.

When the access right setting button 45 corresponding to the folder A, the folder B, or the folder C is clicked with the use of the input unit 26*a*, a sub window 61 for setting access rights is displayed as shown in FIG. 6A. In this case, access rights to the folder corresponding to the clicked access right setting button 45 are set.

On the sub window 61, the read right (Read), the write right (Write), and the delete right (Delete) are set for each user ID. For example, to set the read right (Read) of the user AAA, the operator inputs "o" to the box representing the read right (Read) of the user AAA, and then clicks the OK button.

When one of the excluded list flag buttons 39 shown in FIG. 5A is clicked with the input unit 26*a*, the excluded list setting unit 108 excludes the access control list of the folder corresponding to the clicked excluded list flag button 39 from the access control lists of all the folders that are used for determining whether access to a file is allowed and are associated with the file.

When the icon for the folder A among the icons 44 shown in FIG. 5A is clicked with the use of the input unit 26*a*, the UI shown in FIG. 5B is displayed. Likewise, when the icon for the folder B or the folder C is clicked with the use of the input unit 26*a*, the corresponding UI is displayed.

Like the UI shown in FIG. 5A, the UI shown in FIG. 5B includes an address input box 40, a tree structure displaying space 41, and a contents displaying space 42. The contents displaying space 42 displays icons 46 for the file L, the file M, and the file N, folder adding buttons 47 corresponding to the respective files represented by the icons 46, folder deleting buttons 48 corresponding to the respective icons 46, access right setting buttons 49 corresponding to the respective icons 46, and flag buttons 43 corresponding to the respective icons 46.

When one of the icons 46 for the file L, the file M, and the file N is clicked with the use of the input unit 26*a*, the application for displaying the contents of the file corresponding to the clicked icon 46 is started so that the operator can view the contents of the file. If the contents of the file are audio data, the client 2*a* starts the application for reproducing the audio data as the contents of the file with the use of a sound reproducing unit (not shown), so that the operator can listen to the contents of the file.

Figure 6B:
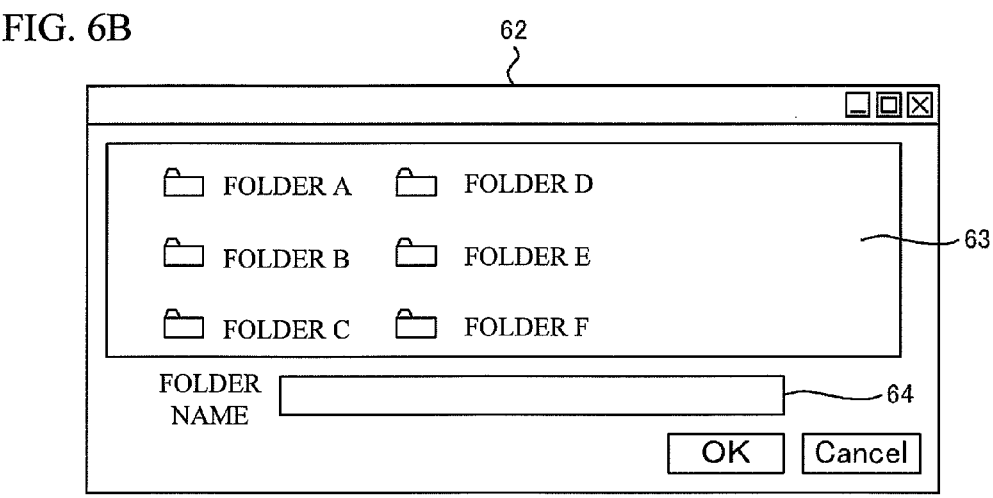
FIG. 6B shows an example of the sub window for adding a folder to store files.

When the folder adding button 47 corresponding to the file L is clicked with the use of the input unit 26*a*, for example, a sub window 62 designed for adding a folder to store the file L is displayed as shown in FIG. 6B. The sub window 62 includes a candidate display space 63 that displays candidate folders, and a box 64 that displays a folder name selected by the user with the use of the input unit 26*a*.

If the folder D is selected from the candidate display space 63 with the use of the input unit 26*a*, the "folder D" that is the folder name of the selected folder is displayed in the box 64. When the OK button is clicked, the file L is associated with the folder D, or the file L is linked to the folder D. In this case, only one file L exists in the HDD 14, but the operator can find the file L from the folder A or the folder D.

When the folder deleting button 48 corresponding to the file L is clicked with the use of the input unit 26*a*, for example, the sub window 62 shown in FIG. 6B is displayed. In this case, the candidate display space 63 displays only the folders associated with the file L. When a folder is selected from the candidate display space 63 with the use of the input unit 26*a*, the selected folder is displayed in the box 64. When the OK button is clicked, the CPU 11 cancels the association between the selected folder and the file L.

When the access right setting button 49 corresponding to one of the file L, the file M, and the file N is clicked with the use of the input unit 26*a*, the sub window 61 designed for setting access rights is displayed as shown in FIG. 6A. In this case, the rights of access to the file corresponding to the clicked access right setting button 49 are set.

Figure 7:
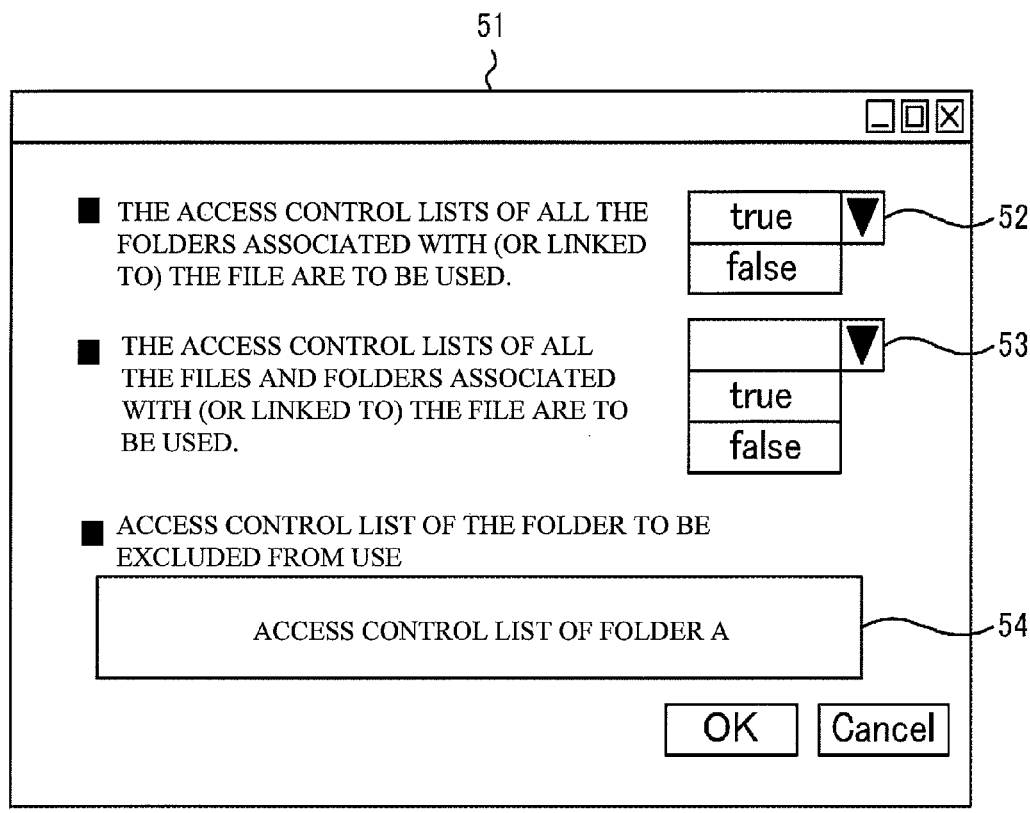
FIG. 7 shows an example of the sub window for setting flags concerning the use of access control lists.

When one of the flag buttons 43 shown in FIG. 5B is clicked with the use of the input unit 26*a*, a sub window 51 designed for setting a flag with respect to the use of the access control lists is displayed as shown in FIG. 7.

A flag 52 shown in FIG. 7 is a flag for determining whether to use the access control lists of all the folders associated with (or linked to) the subject file. A flag 53 is a flag for determining whether to use the access control lists of all the folders associated with (or linked to) the subject file and the access control list of the subject file. A setting box 54 is a box for setting the access control list of a folder to be excluded from the access control lists of folders to be used.

In a case where the flag 52 indicates "true" while the flag 53 indicates "true", when a request for access to a file is issued from a user, the determining unit 104 determines whether access to the file is allowed, using the access control lists of all the folders associated with the file and the access control list of the file.

In a case where the flag 52 indicates "true" while the flag 53 indicates "false", when a request for access to a file is issued from a user, the determining unit 104 determines whether access to the file is allowed, using the access control lists of all the folders associated with the file.

In a case where the flag 52 indicates "false", when a request for access to a file is issued from a user, the determining unit 104 determines whether access to the file is allowed, using the access control list of the file. In the case where the flag 52 indicates "false", the flag 53 is blank, and neither "true" nor "false" can be selected.

In a case where an access control list of a folder is set in the setting box 54, even if at least one of the flags 52 and 53 indicates "true", the excluded list setting unit 108 excludes the access control list of the folder set in the setting box 54 from the access control lists of all the folders associated with the subject file.

As described above, when one of the excluded list flag buttons 39 shown in FIG. 5A is clicked, the excluded list setting unit 108 also excludes the access control list of the folder corresponding to the clicked excluded list flag button 39. Accordingly, in this exemplary embodiment, it is possible to employ either the setting box 54 or the excluded list flag buttons 39.

The various kinds of information set through the UIs and the sub windows 51, 61, and 62 shown in FIGS. 5A through 7 (such as the information about associations between folders and files, the information about the access control lists, the information about the excluded list flag buttons 39, the information about the flags 52 and 53 and the setting box 54) are stored in the HDD 14 of the server 1, and are referred to by the CPU 11 when necessary.

Figure 8:
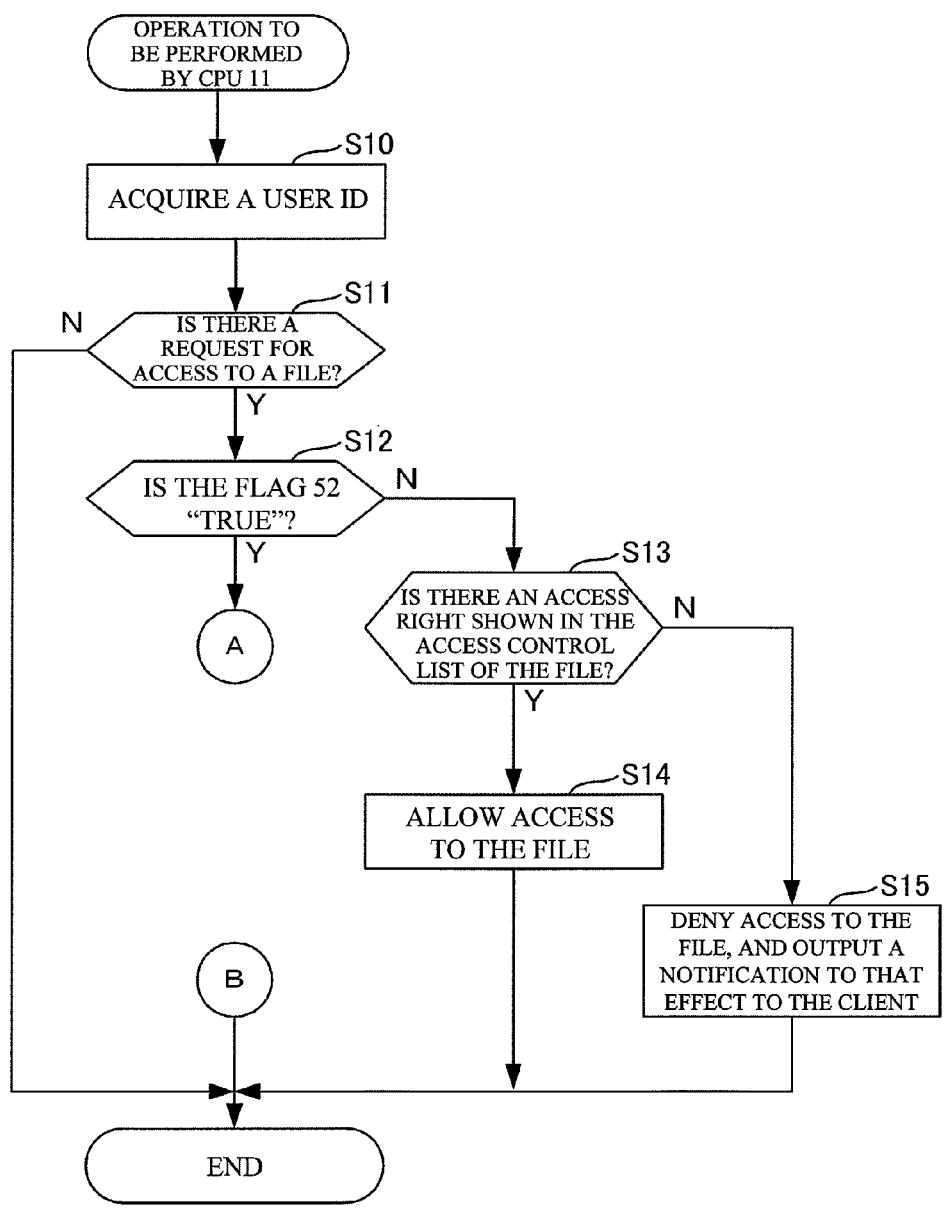
FIG. 8 is a flowchart showing an example operation to be performed by the CPU of the server.
Figure 9:
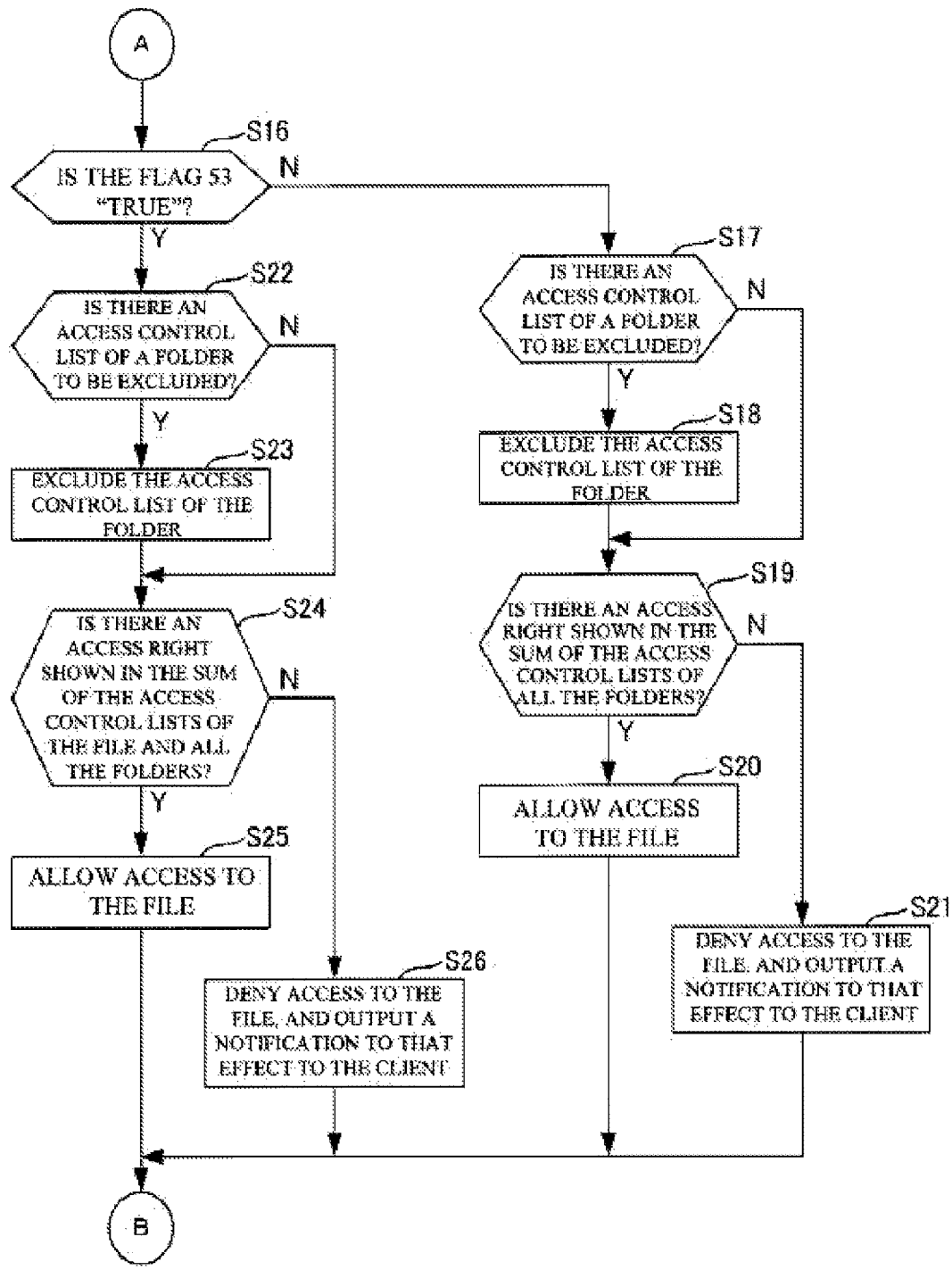
FIG. 9 is a flowchart showing the example operation to be performed by the CPU of the server.

FIGS. 8 and 9 are flowcharts showing an example operation to be performed by the server 1 (the CPU 11 of the server 1) to control access to a file.

First, the acquiring unit 101 acquires a user ID that is input with the input unit 26a (step S10). The determining unit 104 determines whether there is a request for access to a file from the user (step S11). If "NO" in step S11, this operation comes to an end. If "YES" in step S11, the determining unit 104 determines whether the flag 52 indicates "true", based on the information about the flags 52 and 53 and the setting box 54 stored in the HDD 14 (step S12). Here, the determining unit 104 determines whether to use the access control lists of all the folders associated with the file.

If the determination result of step S12 is "NO", the determining unit 104 determines whether the user has an access right, based on the user ID and the access control list of the subject file stored in the HDD 14 (step S13). More specifically, the determining unit 104 determines whether "o" is set in the box representing an access right of the user ID in the access control list of the subject file, so as to determine whether to allow the user to access the subject file.

If the determination result of step S13 is "YES", the access control unit 105 allows the user to access the file, based on the access control list of the file (step S14), and this operation comes to an end. For example, if the access rights given to the user includes the read right, the user can read the file. If the determination result of step S13 is "NO", the access control unit 105 denies access to the subject file, and outputs a notification to that effect to the client 2a (step S15). This operation then comes to an end. The display 25a of the client 2a displays the information indicating that access has been denied.

If the determination result of step S12 is "YES", the determining unit 104 determines whether the flag 53 indicates "true", based on the information about the flags 52 and 53 and the setting box 54 stored in the HDD 14 (step S16). Here, the determining unit 104 determines whether to use the access control list of the subject file and the access control lists of all the folders associated with the subject file.

If the determination result of step S16 is "NO", the determining unit 104 determines whether there is an access control list of a folder to be excluded, based on the setting contents of the setting box 54 or the clicked states of the excluded list flag buttons 39 (step S17).

If the determination result of step S17 is "YES", the determining unit 104 excludes the access control list of the folder to be excluded, before the sum of the access control lists of all the folders is determined (step S18). If the determination result of step S17 is "NO", the procedure of step S18 is skipped.

The determining unit 104 then determines the sum of the access control lists of all the folders associated with the subject file, and determines whether the user has an access right, based on the user ID and the sum of the access control lists of all the folders (step S19). In this manner, the determining unit 104 determines whether to allow the user to access the subject file. The determining unit 104 excludes the access control list of the folder to be excluded in step S18, and, in step S19, determines whether the user has an access right, based on the user ID and the sum of the access control lists of the remaining folders.

FIG. 10 shows an example of the sum of the access control lists of the folder A, the folder B, and the folder C. If only one folder is associated with the file to be accessed, the determining unit 104 in step S19 determines whether the user has an access right, based on the access control list of the only one folder.

If the determination result of step S19 is "YES", the access control unit 105 allows the user to access the file, based on the sum of the access control lists of all the folders (step S20), and this operation comes to an end.

If the determination result of step S17 is "NO", the access control unit 105 denies access to the file, and outputs a notification to this effect to the client 2a (step S21). This operation then comes to an end. The display 25a of the client 2a displays the information indicating that access has been denied.

If the determination result of step S16 is "YES", the determining unit 104 determines whether there is an access control list of a folder to be excluded, based on the setting contents of the setting box 54 or the clicked states of the excluded list flag buttons 39 (step S22).

If the determination result of step S22 is "YES", the determining unit 104 excludes the access control list of the folder to be excluded, before the sum of the access control lists of all the folders is determined (step S23). If the determination result of step S22 is "NO", the procedure of step S23 is skipped.

The determining unit 104 then determines the sum of the access control list of the subject file and the access control lists of all the folders associated with the subject file, and determines whether the user has an access right, based on the user ID and the sum of the access control lists of the subject file and all the folders (step S24). In this manner, the determining unit 104 determines whether to allow the user to access the subject file. The determining unit 104 excludes the access control list of the folder to be excluded in step S23, and, in step S24, determines whether the user has an access right, based on the user ID and the sum of the access control lists of the subject file and the remaining folders.

FIG. 11 shows an example of the sum of the access control lists of the file L, the folder A, the folder B, and the folder C. If only one folder is associated with the file to be accessed, the determining unit 104 in step S24 determines whether the user has an access right, based on the sum of the access control lists of the subject file and the only one folder.

If the determination result of step S24 is "YES", the access control unit 105 allows the user to access the file, based on the sum of the access control lists of the subject file and all the folders (step S25), and this operation comes to an end. If the determination result of step S20 is "NO", the access control unit 105 denies access to the file, and outputs a notification to this effect to the client 2a (step S26). This operation then comes to an end. The display 25a of the client 2a displays the information indicating that access has been denied.

Figure 12:
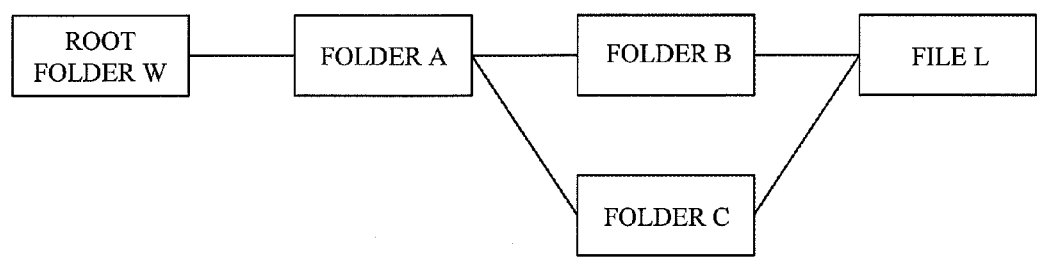
FIG. 12 shows a modification of the file system.

In step S24, the determining unit 104 determines whether to allow access to the subject file, based on the sum of the access control lists of the subject file and the folders. In a case where the folder A is the upper layer of the folders B and C, as shown in FIG. 12, when a user requests access to the folder B, the determining unit 104 may determine whether to allow access to the folder B, based on the sum of the access control lists of the folder A and the folder B. This can be realized by providing a flag button 43 for each folder, like a flag button 43 being provided for each file. The user clicks the flag button 43 corresponding to a lower-level file, and inputs suitable settings to the flags 52 and 53 or the setting box 54, so as to determine whether to use the access control lists of all the upper-level folders associated with the lower-level folder, determine whether to use the access control list of the lower-level folder and the access control lists of all the upper-level folders associated with (or linked to) the lower-level folder, and designate an access control list of a folder to be excluded. Here, the flag 52 serves as a flag for determining whether to use the access control lists of all the upper-level folders associated with the subject lower-level folder.

In the above-described exemplary embodiment, an access control list of a folder to be excluded is designated with the use of the setting box 54 or one of the excluded list flag buttons 39. Alternatively, it is possible to designate the access control lists of folders to be used. For example, a flag for setting whether to validate an access control list is set for each folder, and the determining unit 104 uses only the access control lists of folders having the flags indicating "true" when determining whether to allow access to a file.

Second Exemplary Embodiment

This exemplary embodiment differs from the first exemplary embodiment in that access to a file is allowed or denied with the use of the access control list of a folder that is being viewed by a user.

An electronic information management system in accordance with this exemplary embodiment has the same structure as the electronic information management system shown in FIG. 1.

Figure 13:
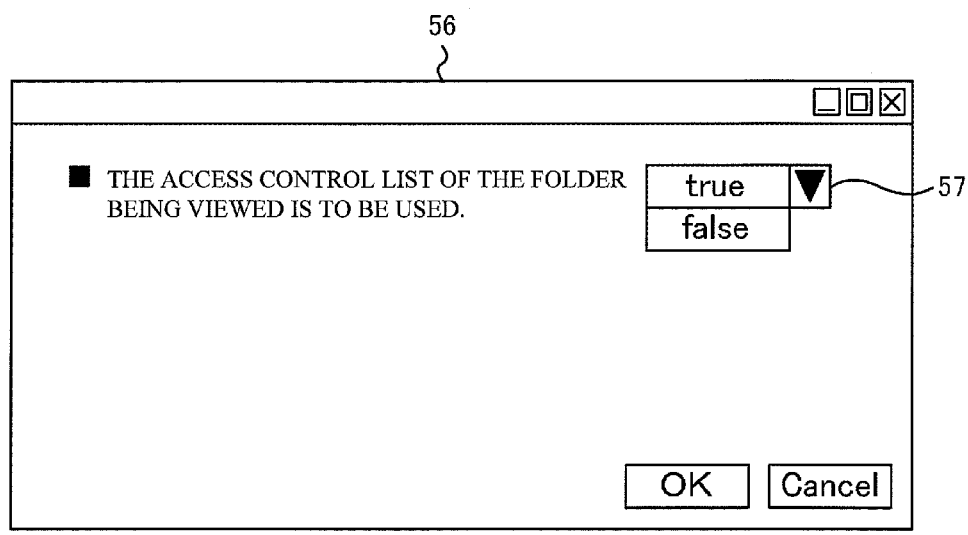
FIG. 13 shows an example of a sub window to be displayed on a display in accordance with a second exemplary embodiment of the present invention.

FIG. 13 shows an example of a sub window that is displayed on the display 25*a* when one of the flag buttons 43 shown in FIG. 5B is clicked.

In this drawing, the sub window 56 includes a flag 57, an OK button, and a cancel button. The flag 57 is a flag for determining whether to use the access control list of the folder that is being viewed by the user.

In a case where the flag 57 is "true", when the user requests access to a file, the determining unit 104 determines whether access to the file is allowed, using the access control list of the folder being viewed by the user. In a case where the flag 57 is "false", when the user requests access to a file, the determining unit 104 determines whether access to the file is allowed, using the access control list of the file.

Figure 14:
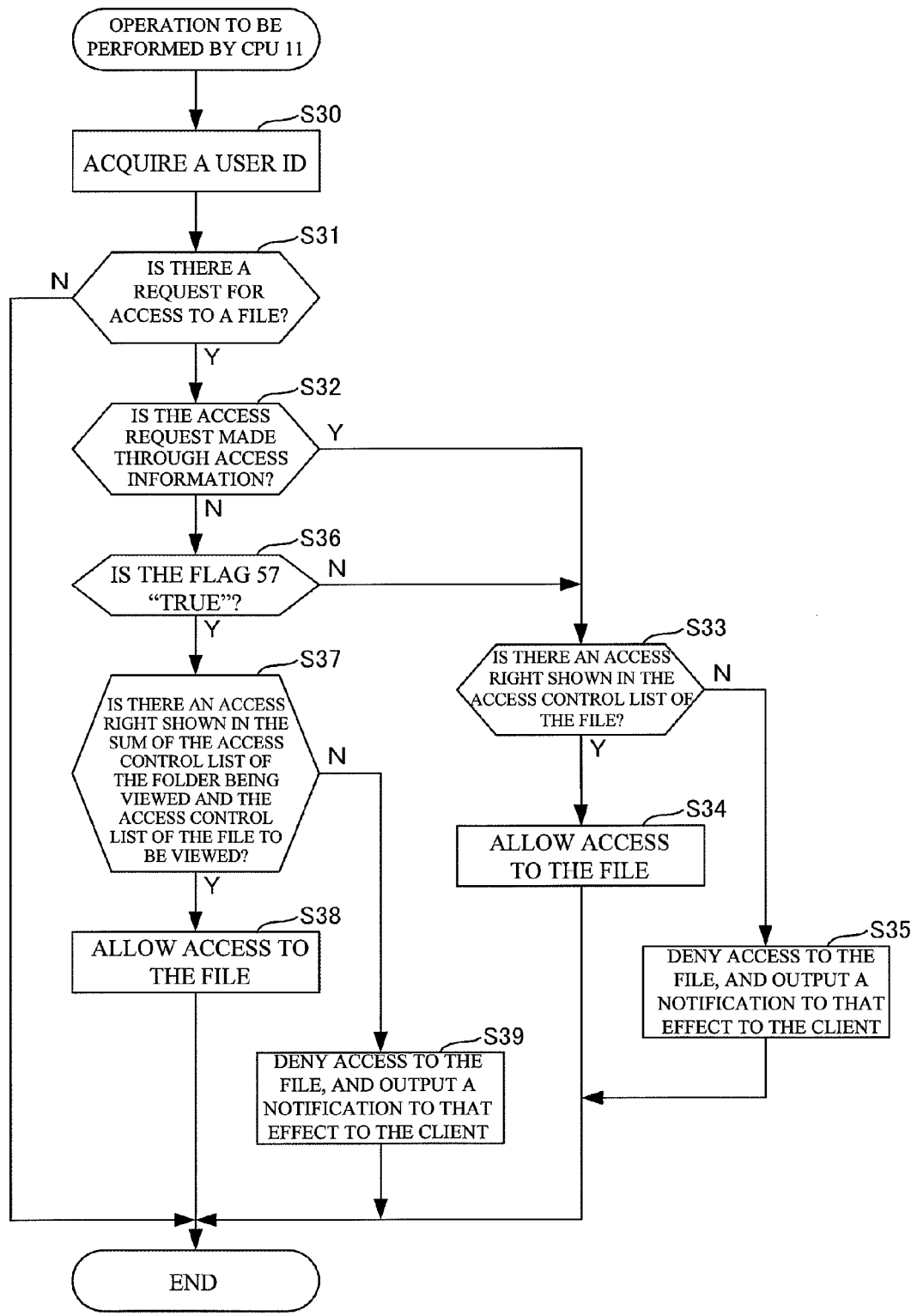
FIG. 14 is a flowchart showing an example operation to be performed by the CPU of a server in accordance with the second exemplary embodiment.

FIG. 14 is a flowchart showing an example of an operation to be performed by the server 1 (the CPU 11 of the server 1).

First, the acquiring unit 101 acquires a user ID that is input with the input unit 26*a* (step S30). The determining unit 104 then determines whether there is a request for access to a file from a user (step S31). If "NO" in step S31, this operation comes to an end. If "YES" in step S31, the determining unit 104 determines whether the access request is made by inputting access information to the address input box 40 of the corresponding UI (step S32).

Here, the determining unit 104 determines whether the user wishes to view the contents of the file directly, based on the input of the access information (such as a URL: Uniform Resource Locator) in the address input box 40 shown in FIG. 5A. For example, when the user inputs access information "http://server1/openfile/id=123456" to the address input box 40 with the use of the input unit 26*a*, this access information is transmitted to the server 1 so as to start the application for displaying the contents of the file. The access information "http://server1/openfile/id=123456" is a command to open the file that has the ID 123456 and is stored in the server 1. A unique ID is attached to each file.

When the user is to view the contents of a file, one of the following two methods is utilized. 1) The user inputs access information to the address input box 40, and views the contents of the file directly (the above-described access to a file with the first accessing unit). 2) The user selects a desired folder through the UI shown in FIG. 5A, and selects a desired file through the UI shown in FIG. 5B, so as to view the contents of the file (the above-described access to a file with the second accessing unit). The above access method 1) is equivalent to the procedures to be carried out when the determination result of step S32 is "YES", and the above access method 2) is equivalent to the procedures to be carried out when the determination result of step S32 is "NO".

If the determination result of step S32 is "YES", the determining unit 104 determines whether the user has a right to access the subject file, based on the user ID and the access control list of the file requested by the user through the access request (step S33). More specifically, the determining unit 104 determines whether "o" is set in the box representing an access right corresponding to the user ID in the access control list of the subject file. In this manner, the determining unit 104 determines whether to allow the user to access the subject file.

If the determination result of step S33 is "YES", the access control unit 105 allows the user to access the subject file, based on the access control list of the file (step S34), and this operation comes to an end. If the read right is the only access right given to the user, for example, the user reads the subject file. If the determination result of step S33 is "NO", the access control unit 105 denies access to the subject file, and outputs a notification to that effect to the client 2*a* (step S35). This operation then comes to an end. The display 25*a* of the client 2*a* displays the information indicating that access has been denied.

If the determination result of step S32 is "NO", the determining unit 104 determines whether the flag 57 is "true" (step S36). If the determination result of step S36 is "NO", the operation moves on to step S33. If the determination result of step S36 is "YES", the determining unit 104 determines whether the user has an access right, based on the user ID and the sum of the access control list of the folder being viewed and the access control list of the file to be viewed (step S37).

If the determination result of step S37 is "YES", the access control unit 105 allows the user to access the file, based on the sum of the access control list of the folder being viewed and the access control list of the file to be viewed (step S38). This operation then comes to an end. If the determination result of step S37 is "NO", the access control unit 105 denies access to the subject file, and outputs a notification to that effect to the client 2*a* (step S39). This operation then comes to an end. The display 25*a* of the client 2*a* displays the information indicating that access has been denied.

As described above, in a case where the contents of a file are viewed by inputting access information to the address input box 40 (the method of access a file with the first accessing unit), the determining unit 104 determines whether access to a subject file is allowed, using the access control list of the subject file to be accessed.

In a case where the contents of a file are viewed by selecting a desired file from the UI shown in FIG. 5A and selecting a desired file from the UI shown in FIG. 5B (the method of accessing a file with the second accessing unit), if the flag 57 is "true", the determining unit 104 determines whether access to a file to be accessed is allowed, using the sum of the access control list of the folder being viewed and the access control list of the file to be viewed.

In the case where the contents of a file are viewed by selecting a desired file from the UI shown in FIG. 5A and selecting a desired file from the UI shown in FIG. 5B, if the flag 57 is "false", the determining unit 104 determines whether access to a file to be accessed is allowed, using the access control list of the file to be accessed.

As a modification of this exemplary embodiment, a case where the folder A is the upper layer of the folders B and C as shown in FIG. 12 is described. If the flag 57 is set at "true", and a user requests access to the folder B, the determining unit 104 may determine whether the user has a right to access the folder B, based on the access control list of the upper-level folder A being viewed and the access control list of the folder B. This can be realized by providing a flag button 43 for each folder, like a flag button 43 being provided for each file. As in the first exemplary embodiment, a user clicks the flag button 43 corresponding to the subject lower-level folder, and inputs suitable settings to the flags 52 and 53 or the setting box 54, so as to determine whether to use the access control lists of all the upper-level folders associated with the subject lower-level folder, determine whether to use the access control list of the subject lower-level folder and the access control lists of all the upper-level folders associated with (or linked to) the subject lower-level folder, and designate an access control list of a folder to be excluded.

In this exemplary embodiment, an access control list of a folder to be excluded may not be designated, but the access control lists of folders to be used may be designated. For example, a flag for determining whether to validate an access control list is set for each folder, and the determining unit 104 uses only the access control lists of folders each having the flag indicating "true" when determining whether to allow access to a file.

In the above-described first and second exemplary embodiments, each UI is displayed on the display 25a of the client 2a. However, each UI may be displayed on the display 15 of the server 1. Also, in each of the above-described first and second exemplary embodiments, the functions of an electronic information management system including the server 1 and the clients 2a and 2b have been described. However, the above-described functions of an electronic information management system may be realized by a stand-alone computer (such as the server 1).

A recording medium having a software program for realizing the functions of the server 1 recorded thereon may be supplied to the server 1. The CPU of the server 1 may then read and execute the program recorded on the recording medium, so as to achieve the same effects as those of the first and second exemplary embodiments. The recording medium for providing the program may be a CD-ROM, a DVD, or a SD card, for example. The software program is capable of being transferred, for example, via Internet.

Also, the CPU of the server 1 may execute the software program for realizing the functions of the server 1, so as to achieve the same effects as those of the above-described first and second exemplary embodiments.

It should be understood that the present invention is not limited to the above-described exemplary embodiments, and various modifications may be made to them without departing from the scope of the invention.

What is claimed is:

1. An electronic information management device comprising:
   a hardware processor that controls the electronic information management device to perform:
   associating electronic information with a first folder from which the electronic information is accessible, associating the electronic information with a second folder from which the electronic information is accessible, associating first access right information with the first folder, the first access right information indicating an access right of a user to access the electronic information from the first folder, and associating second access right information with the second folder, the second access right information indicating an access right of the user to access the electronic information from the second folder;
   determining one of the first access right information and the second access right information as excluded access right information, the excluded access right information excluded from a determination of whether the user is allowed to access the electronic information from one of the first folder and the second folder;
   receiving from the user a request to access the electronic information from the one of the first folder and the second folder;
   determining, in response receiving the request to access the electronic information, a sum of the first access right information and the second access right information, excluding the excluded access right information from the determined sum, and determining whether to allow the user to access the electronic information based on the sum of the first access right information and the second access right information excluding the excluded access right information; and
   controlling access to the electronic information in response to determining whether to allow the user to access the electronic information.

2. The electronic information management device according to claim 1, wherein the hardware processor controls the electronic information management device to associate the electronic information with a third folder from which the electronic information is accessible and associates the third folder with third access right information that indicates an access right of the user to access the electronic information from the third folder, and
   determine whether to allow the user to access the electronic information, based on a sum of the first access right information, the second access right information, and the third access right information.

3. An electronic information management device comprising:
   a hardware processor that controls the electronic information management device to perform:
   associating electronic information with file access right information that indicates an access right of a user to access the electronic information, associating the electronic information with a first folder from which the electronic information is accessible, associating the electronic information with a second folder from which the electronic information is accessible, associating first access right information with the first folder, the first access right information indicating an access right of the user to access the electronic information from the first folder, and associating second access right information with the second folder, the second access right information indicating an access right of the user to access the electronic information from the second folder;
   determining one of the first access right information and the second access right information as excluded access right information, the excluded access right information excluded from a determination of whether the user is allowed to access the electronic information from one of the first folder and the second folder;
   receiving from the user a first input to access the electronic information;
   receiving from the user a second input to access to access the electronic information through the one of the first folder and the second folder;
   determining, in response to receiving the first input, whether to allow the user to access the electronic information based on the first access right information, and in response to receiving the second input, determining a sum of the first access right information and the second access right information, excluding the excluded access right information from the determined sum, and determining whether to allow the user to access the electronic information based on the sum of the second access right information and the first access right information excluding the excluded access right information; and controlling access to the electronic information in response to determining whether to allow the user to access the electronic information.

4. A non-transitory computer readable recording medium causing a computer to execute a process for controlling access, the process comprising:

associating electronic information with a first folder from which the electronic information is accessible, associating the electronic information with a second folder from which the electronic information is accessible, associating first access right information with the first folder, the first access right information indicating an access right of a user to access the electronic information from the first folder, and associating second access right information with the second folder, the second access right information indicating an access right of the user to access the electronic information from the second folder;

determining one of the first access right information and the second access right information as excluded access right information, the excluded access right information excluded from determining whether the user is allowed to access the electronic information from one of the first folder and the second folder;

receiving from the user a request to access the electronic information from the one of the first folder and the second folder;

in response to receiving the request to access the electronic information, determining a sum of the first access right information and the second access right information, excluding the excluded access right information from the determined sum, and determining whether to allow the user to access the electronic information based on the sum of the first access right information and the second access right information excluding the excluded access right information; and controlling access to the electronic information in response to determining whether to allow the user to access the electronic information.

5. A non-transitory computer readable recording medium causing a computer to execute a process for controlling access, the process comprising:

associating electronic information with file access right information that indicates an access right of a user to access the electronic information, associating the electronic information with a first folder from which the electronic information is accessible, associating the electronic information with a second folder from which the electronic information is accessible, associating first access right information with the first folder, the first access right information indicating an access right of the user to access the electronic information from the first folder, and associating second access right information with the second folder, the second access right information indicating an access right of the user to access the electronic information from the second folder;

determining one of the first access right information and the second access right information as excluded access right information, the excluded access right information excluded from a determination of whether the user is allowed to access the electronic information from one of the first folder and the second folder;

receiving from the user a first input to access to the electronic information;

receiving from the user a second input to access the electronic information through the one of the first folder and the second folder;

in response to receiving the first input, determining whether to allow the user to access the electronic information based on the first access right information, and in response to receiving the second input, determining a sum of the first access right information and the second access right information, excluding the excluded access right information from the determined sum, and determining whether to allow the user to access the electronic information based on the sum of the second access right information and the first access right information excluding the excluded access right information; and controlling access to the electronic information in response to determining whether to allow the user to access the electronic information.

6. A method for controlling access comprising:

associating electronic information with a first folder from which the electronic information is accessible, associating the electronic information with a second folder from which the electronic information is accessible, associating first access right information with the first folder, the first access right information indicating an access right of a user to access the electronic information from the first folder, and associating second access right information with the second folder, the second access right information indicating an access right of the user to access the electronic information from the second folder;

determining, by a hardware processor, one of the first access right information and the second access right information as excluded access right information, the excluded access right information excluded from determining whether the user is allowed to access the electronic information from one of the first folder and the second folder;

receiving from the user a request to access the electronic information from the one of the first folder and the second folder;

in response to receiving the request to access the electronic information, determining a sum of the first access right information and the second access right information, excluding the excluded access right information from the determined sum, and determining whether to allow the user to access the electronic information based on the sum of the first access right information and the second access right information excluding the excluded access right information; and controlling access to the electronic information in response to determining whether to allow the user to access the electronic information.

7. A method for controlling access comprising:

associating electronic information with file access right information that indicates an access right of a user to access the electronic information, associating the electronic information with a first folder from which the electronic information is accessible, associating the electronic information with a second folder from which the electronic information is accessible, associating first access right information with the first folder, the first access right information indicating an access right of the user to access the electronic information from the first folder, and associating second access right information with the second folder, the second access right information indicating an access right of the user to access the electronic information from the second folder;

determining, by a hardware processor, one of the first access right information and the second access right information as excluded access right information, the excluded access right information excluded from a determination of whether the user is allowed to access the electronic information from one of the first folder and the second folder;

receiving from the user a first input to access to the electronic information;

receiving from the user a second input to access the electronic information through the one of the first folder and the second folder;

in response to receiving the first input, determining whether to allow the user to access the electronic information based on the first access right information, and in response to receiving the second input, determining a sum of the first access right information and the second access right information, excluding the excluded access right information from the determined sum, and determining whether to allow the user to access the electronic information based on the sum of the second access right information and the first access right information excluding the excluded access right information; and controlling access to the electronic information in response to determining whether to allow the user to access the electronic information.

8. An electronic information management device comprising:

a hardware processor that controls the electronic information management device to perform:

associating electronic information with first access right information with respect to each user, the electronic information being associated with an associated site so that the electronic information is stored at the associated site, and associating the associated site with second access right information with respect to each user;

receiving information about access to the electronic information, and accessing the electronic information in accordance with the received access information;

receiving selections of the associated site and the electronic information stored at the associated site, and accessing the selected associated site and the selected electronic information, a flag that determines whether to use the second access right information associated with the user's viewing associated site;

determining, when an access request for the electronic information is received, whether the received access request is the access request for the electronic information or the access request for the electronic information stored at the associated site, when the received access request is the access request for the electronic information determining whether to allow a user to access the electronic information, based on the first access right information associated with the electronic information according to the received access request, when the received access request is the access request for the electronic information stored at the associated site and the flag is set so as to use the second access right information, determining whether to allow the user to access the electronic information, based on the sum of the second access right information associated with the selected associated site and the first access right information associated with the selected electronic information and when the received access request is the access request for the electronic information stored at the associated site and the flag is set so as not to use the second access right information, determining whether to allow the user to access the electronic information, based on the first access right information associated with the selected electronic information; and controlling access to the electronic information in accordance with a determination result of the determining.

\* \* \* \* \*